United States Patent

[11] 3,552,717

[72] Inventor Alton D. Oliver
 Houston, Tex.
[21] Appl. No. 781,028
[22] Filed Dec. 4, 1968
[45] Patented Jan. 5, 1971
[73] Assignee ACF Industries, Incorporated
 New York, N.Y.
 a corporation of New Jersey

[54] BALL VALVE HAVING TRUNNION STOP
 10 Claims, 5 Drawing Figs.
[52] U.S. Cl. .................................................. 251/285
[51] Int. Cl. ............................................. F16k 51/00
[50] Field of Search ........................................ 251/284-
 —288, 306

[56] References Cited
 UNITED STATES PATENTS
 1,484,643 2/1924 Hansen ....................... 251/286X
 1,814,534 7/1931 Van Etten ...................... 251/287
 2,766,961 10/1956 Meusy ......................... 251/285X
 3,186,682 6/1965 Pierson et al. ................. 251/306

Primary Examiner—Henry T. Klinksiek
Attorney—James L. Jackson

ABSTRACT: A rotatable plug valve having trunnions rotatably mounting a plug member within the valve chamber thereof, which plug member is rotatable between open and closed positions and is precisely stopped at each extremity of rotational movement to positively control the flow of fluid through the valve. The valve is provided with a stop pin, which is disposed in a stop pin recess located generally parallel with the axis of the plug trunnions and is disposed in intersecting relation with one of the trunnion bores so that the stop pin is partially exposed along its length within the trunnion bore. Stop surface means on one of the trunnions is engageable with the stop member to limit rotation of the valve element at each extremity of its travel. The stop member is so related to the valve body structure as to prevent the stop pin from being sheared as high magnitude forces are applied thereto.

INVENTOR.
ALTON D. OLIVER
BY
James Jackson
ATTORNEY

3,552,717

BALL VALVE HAVING TRUNNION STOP

BACKGROUND AND DESCRIPTION OF THE INVENTION

This invention is related generally to valves for controlling the flow of fluids, and more particularly to valves having stop constructions for limiting movement of a valve element to properly align a flow passage in the valve element with flow passages defined in the valve body. The valve art is generally considered to be well-developed, and valves having stop elements for limiting movement of a valve element between open and closed positions and for locating valve elements at the predetermined open position thereof are quite well known.

Gate valves are generally provided with upper or lower stop members which are engaged by the gate member at the extremities of its travel to properly align a port within the gate with flow passages through the valve. Plug valves are frequently provided with stops which are formed exteriorly of the valve body, which stops are engaged by devices carried by the operating stem of the valve to determine the open and closed positions thereof. Plug valves of the spherical plug type may utilize external stops or may be provided with a slot or groove cut within the plug which defines stop surfaces for engagement by a stop pin or projection carried by the valve body to limit plug rotation.

It is frequently necessary to assure that the port through the valve plug achieves positive and precise alignment with the flow passages through the valve body to assure passage of line cleaning devices known as "scrapers" or "pigs." While various adjustment mechanisms are employed to assure proper alignment of the rotatable plug member, it is frequently impossible to prevent misalignment of the ports due to metal deformation as the rotatable ports of the valve are subjected to high torque forces.

A primary disadvantage encountered in the manufacture of large valves, such as pipeline ball valves, has been the tendency of stop members such as pins to be sheared due to the extremely high magnitude forces which may be encountered at the extremities of plug rotation. It is quite apparent, when viewing the state of the art, that virtually all stop members or stop surfaces are subjected to shearing forces and, therefore, are subject to being sheared upon the application of extremely high forces thereto.

Plug alignment on initial assembly is frequently made difficult because of tolerances allowed during manufacture of parts for the valve. A condition generally referred to as "tolerance stack up" may be developed as the parts are assembled where several allowable tolerances of the parts accumulate to such a degree that the plug element may not positively align with the flow passages in the open position thereof. To manufacture the parts to closer tolerances would eliminate or render "tolerance stack up" ineffective, but would increase the cost of manufacture to such an extent as to detract from the competitive nature of the product.

It is, therefore, a primary object of this invention to provide a novel valve structure, including a stop member which is capable of limiting valve movement between the open and closed positions thereof and which is subjected only to compression forces upon being engaged by a stop surface.

It is a further object of this invention to provide a novel trunnioned plug valve, including a rotatable trunnion having a stop surface thereon which engages a stop member to limit rotation of the valve element in such manner as to insure against shearing the stop member upon the application of high magnitude forces.

It is an even further object of this invention to provide a novel trunnioned plug valve structure which is capable of being assembled in such manner as to eliminate any misalignment which might be caused by accumulation of manufacturing tolerances.

It is another important object of this invention to provide a novel trunnioned plug valve including internal stop devices for positively locating the plug member in the open and closed positions thereof and which stop devices are not susceptible to metal deformation which might cause misalignment of the plug member relative to the valve passages.

Among the several objects of this invention is contemplated the provision of a novel trunnioned ball valve having a stop construction which is simple in nature, reliable in use, and low in cost.

Other and further objects, advantages, and features of this invention will become apparent to one skilled in the art upon consideration of the written specification, the attached claims, and the annexed drawings. The form of the invention, which will now be described in detail, illustrates the general principles of the invention, but it is to be understood that this detailed description is not to be taken as limiting since the scope of the invention is best defined by the appended claims. Such description will be referred to by reference characters in the drawing in which:

Briefly, the invention concerns a trunnioned ball valve structure having a valve body defining a valve chamber. A spherical valve element or plug is rotatably mounted within the valve chamber upon upper and lower trunnion members, which support the valve member in properly aligned position within the valve chamber. The lowermost trunnion member is provided with a stop surface, which is engageable with a stop member carried by the valve body to limit rotation of the valve element to substantially 90° rotation between its open and closed positions. The stop comprises a pin member, which is fully supported throughout its entire length by a stop support and adjustment member of the valve body so that the pin member is effectively prevented from being sheared as the stop surface of the trunnion bears there against. The adjustment portion of the valve body provides a means for accounting for tolerance accumulation during assembly of the valve components in such manner as to allow precise positioning of the stop pin relative to the trunnion stop surface upon assembly of the valve. After the adjustment member has been properly installed, the rotatable plug member will be positively aligned with the flow passages of the valve in the open position thereof.

Figure 1:
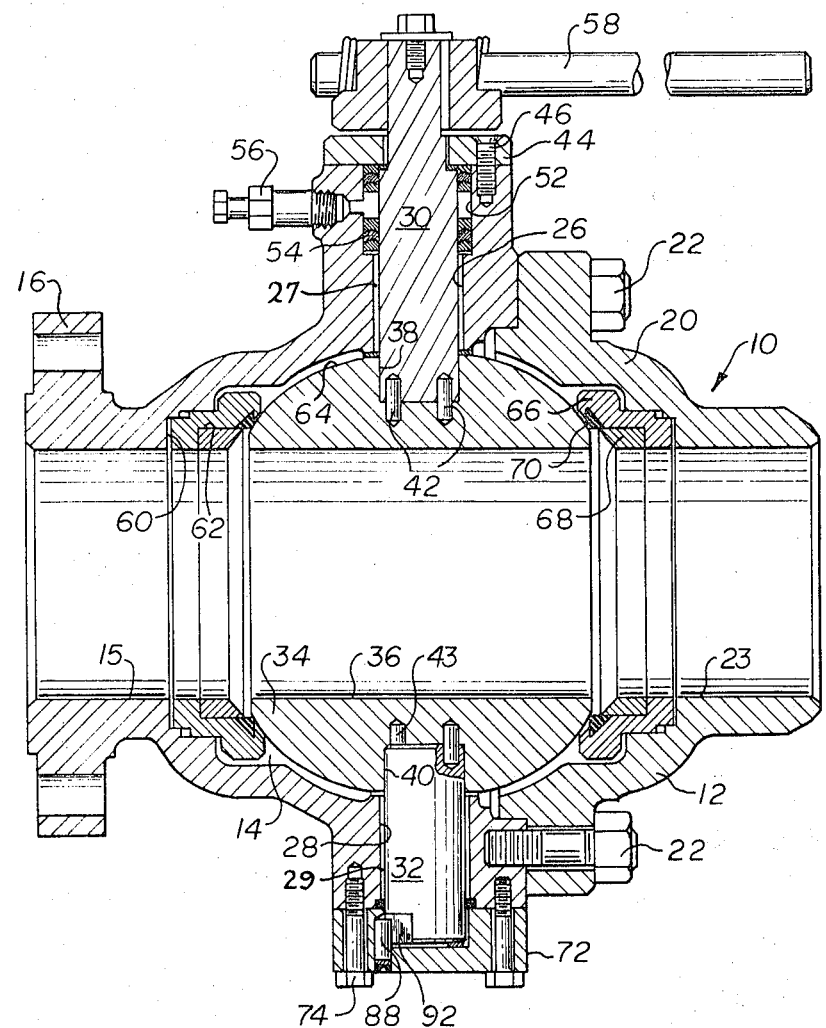
FIG. 1 is a sectional view of a trunnioned ball valve structure constructed in accordance with the present invention.

Referring now to the drawings for a more detailed description of the invention, a valve, which may be an end entry spherical plug valve as illustrated at 10 in FIG. 1, is provided with a valve body portion 12, thereof, defining a valve chamber 14. The body portion 12 of the valve 10 is formed with a flow passage 15, which is disposed in fluid communication with the valve chamber. The valve body may be provided with a flange structure as illustrated at 16 in FIG. 1 or it may be provided with a weld end construction for either bolted or welded construction of the valve 10 to a pipeline or the like. An end closure portion 20 of the valve 10 is retained in sealed assembly with the valve body portion 12 by a series of bolts or threaded studs 22 and defines a closure for the valve chamber. The end closure member 20 is formed with a flow passage 23 which is disposed in axial alignment with the flow passage 15.

The valve body 12 is formed with aligned upper and lower bores 26 and 28, respectively, which receive upper and lower trunnion members 30 and 32, respectively, therein. Sleeve bearings 27 and 29, formed of any suitable plastic or metallic bearing material, serve to reduce friction between the valve body and the upper and lower trunnions. A spherical plug member 34 having a flow passage 36 formed therein is rotatably positioned within the valve chamber 14 and is provided with oppositely disposed generally cylindrical bores 38 and 40 which receive the inner extremities of the trunnions 30 and 32 respectively. The plug member 34 is maintained in nonrotatable relation with the upper trunnion 30 by a pair of pin members 42 which fit within mating bores formed in the plug and in the trunnion 30. A pair of pins 43 maintain a nonrotatable relation between the lower trunnion 32 and the spherical plug 34. An upper cap plate 44 is fixed to the valve body 12 by a series of cap screws 46 to serve as an axial thrust support for the upper trunnion 30. Thrust support for the lower trunnion 32 is provided by a combination thrust support and stop adjustment plate 72, which will be described in detail herein below.

An enlarged bore 52, formed in concentric relation with the bore 26 in the valve body 12, cooperates with the cylindrical surface of the upper trunnion member 30 to define an annular packing chamber. A packing assembly 54, disposed within the packing chamber, establishes a fluidtight seal between the trunnion 30 and the cylindrical wall 52 of the valve body 12. A packing adjustment fitting 56 is fixed to the valve body and is disposed in fluid communication with the packing chamber. An operating handle structure 58 is fixed to the uppermost portion of the upper trunnion 30, in any desirable manner, and is manually rotated to induce rotation to the trunnion 30 and the spherical plug member 34 for opening and closing the valve. The valve structure may also be provided with any of various acceptable hydraulic electrically, or pneumatically driven operator devices for imparting rotation to the spherical plug of the valve within the spirit and scope of this invention.

The valve body 12 of the valve 10 is formed with a pair of seat recesses 60 in which are located a pair of seat assemblies 62 establishing sealing engagement between the valve body and the working surface 64 of the spherical plug member 34. As illustrated in FIG. 1, the seat assemblies 62 include a seat ring 66 and a retainer ring 68 which cooperate to retain an annular elastomer sealing member 70 in interlocked assembly therewith. The sealing member 70 is disposed for sealing engagement with the working surface 64 of the plug member 34.

Figure 2:
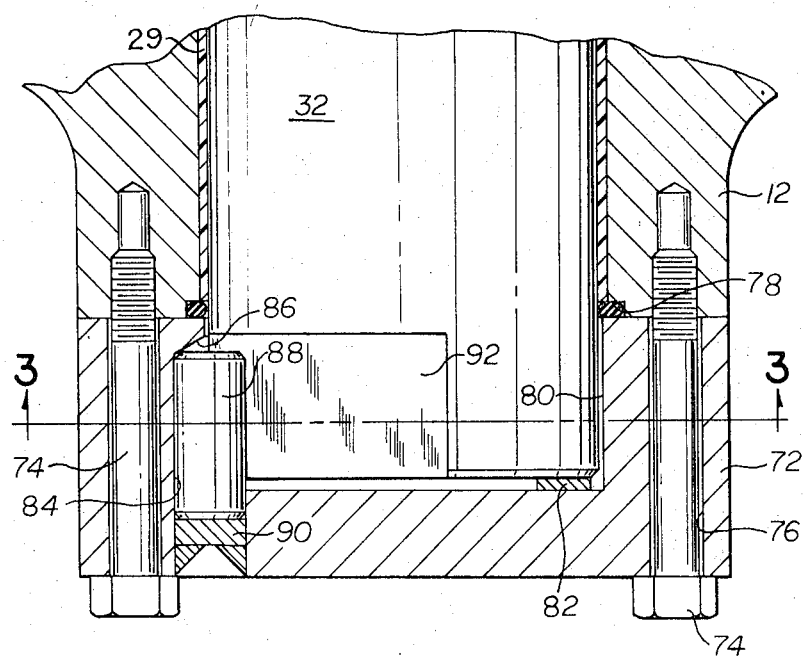
FIG. 2 is a fragmentary sectional view of the lower trunnion portion of the valve of FIG. 1 taken along line 2–2 in FIG. 3, and illustrating the trunnion stop structure in detail.
Figure 3:
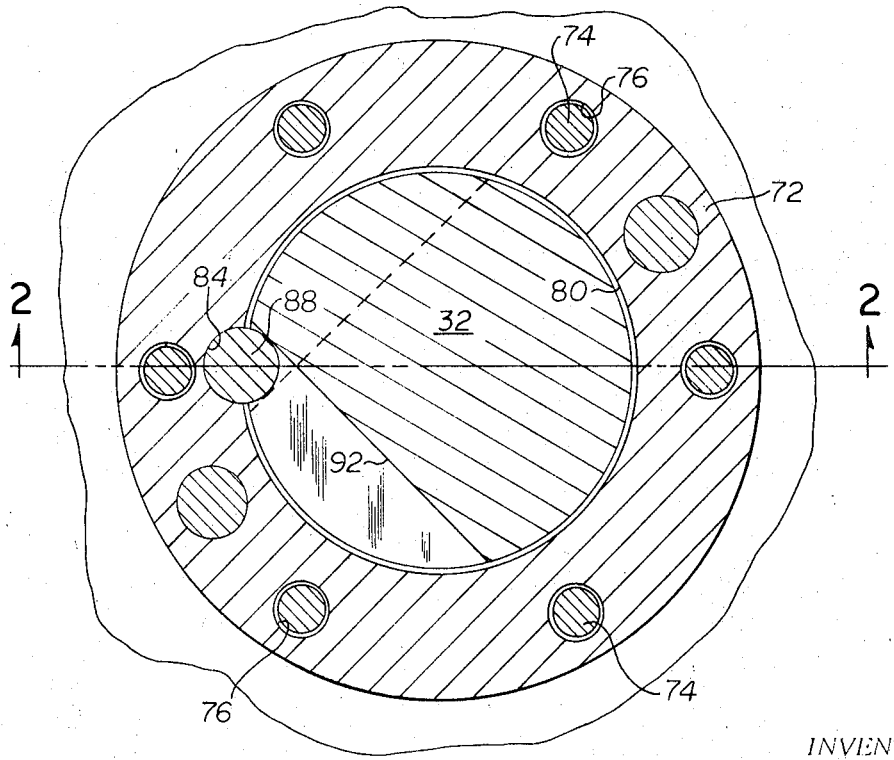
FIG. 3 is a sectional view of the lower trunnion portion of the valve of FIG. 1 taken along lines 3–3 in FIG. 2, and illustrating the trunnion stop structure and the trunnion stop alignment structure in detail.

To provide for proper location of the plug passage 36 relative to the flow passages 15 and 23, the valve is provided with structure to limit rotation of the trunnions thereof. With reference now to FIGS. 2 and 3, and forming an important aspect of this invention, a lower trunnion thrust support and stop adjustment plate 72 is fixed to the valve body 12 by a series of bolts 74 extending through apertures 76 in the thrust support plate and being threadedly received in the valve body. A sealing member 78, which may be of the resilient O-ring type, is disposed in a groove defined between the thrust support plate 72 and the valve body 12 and serves to maintain a positive seal between the valve body and thrust support plate. The plate 72 is provided with an internal blind bore 80 which receives the lowermost portion of the lower trunnion 32. A thrust washer 82 formed of any suitable bearing material is interposed between the lower portion of the trunnion 32 and the substantially planar bottom wall of the blind bore 80 and serves to reduce friction as the trunnion 32 rotates relative to the support plate 72.

For the purpose of limiting rotation of a trunnion 32 relative to the support plate 72, the support plate is provided with a stop pin bore 84 which extends upwardly from the bottom of the support plate 72 and intersects the blind bore 80. The axis of the bore 84 intersects the cylindrical wall of the blind bore 80 so that a major portion of the bore 84 is located outwardly of the cylindrical wall defining the blind bore 80. The uppermost portion of the bore 84 is defined by a stop surface 86 which limits upward movement of a generally cylindrical stop pin member 88 loosely disposed within the bore 84. The stop pin 88 may be composed of any one of numerous acceptable extremely hard materials. It is necessary only that the stop member 88 be sufficiently hard to prevent compressive deformation thereof as the stop surface of the trunnion 32 is forced into engagement therewith. The stop pin 88 is retained within the bore 84 by a support plate 90, which is welded or otherwise fixed to the support plate 72 to permanently retain the stop pin in assembly with the thrust support plate. The trunnion member 32 is provided at its lower extremity with a generally planar stop surface 92 which is so related to the axis of the trunnion 32 and to the dimension of the pin 88 that the trunnion 32 will rotate 90° from engagement with the surface at one extremity of rotation of the trunnion to engagement with the stop surface at the other extremity thereof. For example, as illustrated in FIG. 3 the trunnion 32 is located in the open position of the valve as shown in full line and is rotatable substantially 90° to the closed position of the valve as illustrated in dash lines. The planar surface 92 is also designed to allow slight Brinelling of the planar surface at each extremity thereof as the plug 34 and trunnion 32 are rotated to the open and closed positions thereof under maximum torque force conditions. Such Brinelling in addition to slightly deforming the surface 92 will provide additional bearing surface support between the surface 92 and the pin 88 thereby providing for substantial force distribution between the contacting stop surfaces.

As the stop surface 92 moves into engagement with the stop pin 88, as illustrated in FIG. 3, the pin member 88 instead of being placed in shear, as is ordinarily the case, will be forced against the supporting wall defined by the bore 84. The wall of the bore 84 therefore, provides adequate support for the pin 88 along the entire length thereof so that the stop pin is placed in compression only.

Figure 4:
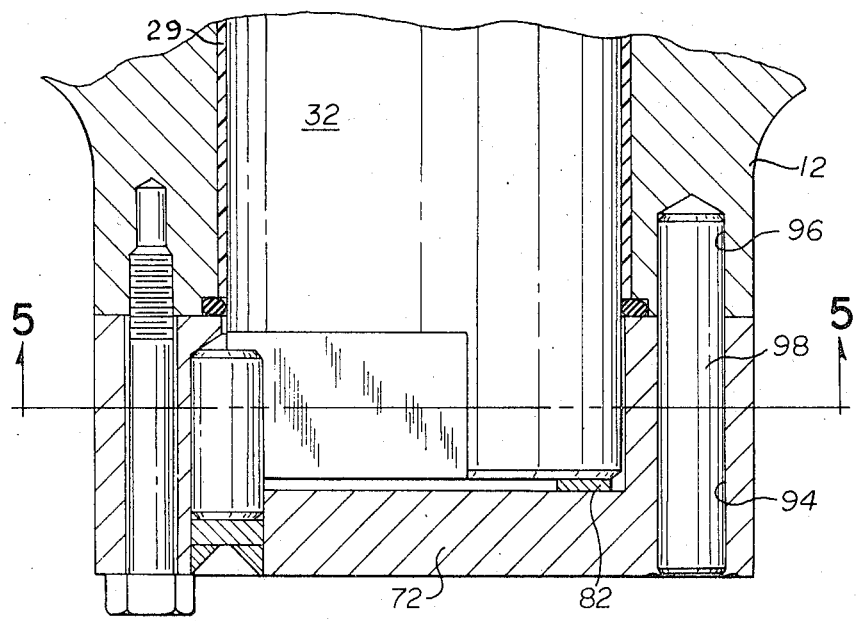
FIG. 4 is a fragmentary sectional view of the lower portion of the valve of FIG. 1 taken along line 4–4 in FIG. 5, and illustrating the trunnion stop and trunnion stop adjustment structure thereof in detail.
Figure 5:
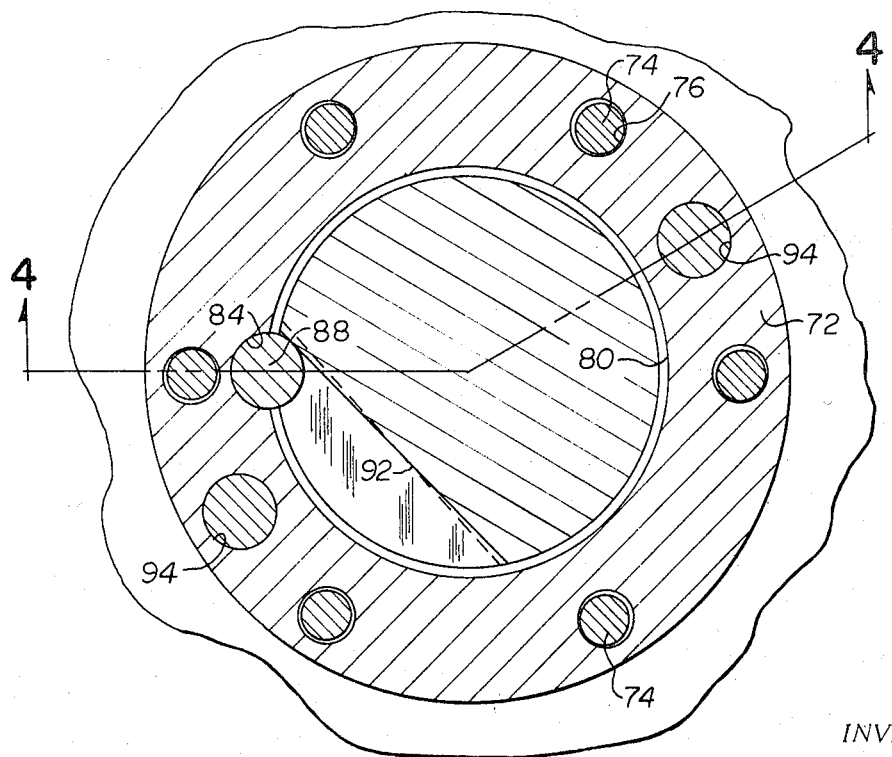
FIG. 5 is a sectional view taken along line 5–5 of FIG. 4, and illustrating adjustment and positive location of the trunnion stop and stop adjustment structure.

With reference now to FIGS. 4 and 5, the valve is provided with structure for precisely adjusting the stop pin 88 relative to the trunnion 32 for the purpose of overcoming any misalignment which might have occurred during assembly due to accumulation of tolerances. Before the valve is assembled, the support plate 72 is provided with a pair of drill guide bores 94 as indicated above, the support plate 72 is fixed to the valve body by the series of bolts 74. The apertures 76 are larger than the bolts 74 so that the support plate may be rotated several thousandths of an inch within limits defined by the clearances between the bolt apertures 76 and the bolts 74.

As illustrated in dash lines in FIG. 5, the stop surface 92 may not touch the stop pin when the spherical plug is disposed in its proper open position. As shown in full line, the thrust support plate 72 has been rotated counterclockwise to bring the stop pin 88 into engagement with the stop surface 92. This slight rotation will be sufficient to overcome any misalignment which might have occurred due to accumulation of tolerances and will allow the stop pin 88 to be brought into precise engagement with the stop surface 92 while the plug member 34 is maintained in the properly aligned position thereof. A pair of alignment apertures 96 are then drilled into the valve body 12 using the guide bores 94 so that the alignment apertures are precisely located relative to the stop pin bore 84. The guide bore and the alignment aperture are then reamed to the same dimension and guide pins 98 are inserted into the bores 94 and apertures 96 in close fitting relation therewith. It is only necessary that the pins 98 be disposed in close fitting relation within the bores 94 and guide apertures 96 so that the thrust support plate 72 is positively aligned and locked with respect to the stop surface 92 on the lower trunnion 32.

It will be evident from the foregoing that I have provided a novel trunnioned plug valve structure employing a simple and unique stop arrangement utilizing a stop pin which is placed in compression by engagement with a stop surface to limit rotation of a valve element between open and closed positions rather than being placed in shear as is usually the case. Through utilization of this arrangement, the stop member achieves the capability of withstanding extremely great forces which may be applied as the valve element is rotated either to its open or closed position. Commercial advantage of the invention is enhanced by the fact that the adjustment arrangement allows the manufacturing of parts to quite wide tolerances since the trunnion stop may be precisely positioned relative to the trunnion during assembly. The valve stem stop structure and the adjustment structure utilize a minimum number of parts thereby further promoting the competitive nature of the valve manufactured. Therefore, it is apparent that this invention is one well adapted to attain all of the objects hereinabove set forth, together with other advantages which will become obvious and inherent from the description of the apparatus itself.

It will be understood that certain combinations and subcombinations are of utility and may be employed without reference to other features and subcombinations. This is contemplated by and is within the scope of the appended claims. As many possible embodiments may be made of the invention without departing from the spirit or scope thereof, it is to be understood that all matters herein set forth are as shown in the accompanying drawings are to be interpreted as illustrative and not in a limiting sense.

I claim:

1. A rotatable plug valve having a valve body defining a valve chamber and having inlet and outlet flow passages in fluid communication with said valve chamber, at least one trunnion member rotatably carried by said valve body, a plug member being disposed in nonrotatable relation with said trunnion member and being rotatable within said valve chamber between open and closed positions thereof to control the flow of fluid through said flow passages, an elongated stop pin being supported by said valve body with the axis thereof in substantially parallel relation with the axis of said trunnion member substantially planar, stop surface means formed on said trunnion and being engageable in line contact with said stop means to limit rotation of said trunnion and said plug member in either rotative direction thereof, said stop means being so related to said valve body that said stop means is subjected only to compression forces upon being engaged by the stop surface means of said trunnion, whereby said stop member will not be sheared upon the application of severe forces thereto.

2. A rotatable plug valve as set forth in claim 1, said valve body defining at least one trunnion bore, a stop recess formed in said body with an axis thereof disposed in substantially parallel relation with the axis of said trunnion bore, said stop recess intersecting said trunnion bore along a peripheral wall thereof, a stop pin disposed within said stop recess and having an elongated exposed portion thereof extending into said trunnion bore, said stop surface means of said trunnion engaging said exposed portion of said stop and compressing said stop pin against the valve body wall defining said stop recess.

3. A rotatable plug valve as set forth in claim 1, said valve body having at least one trunnion bore, said trunnion member being rotatably received within said trunnion bore, elongated stop recess means defined in said valve body and intersecting said trunnion bore along a peripheral wall thereof, an elongated stop pin received within said stop recess in close fitting relation therewith and having an elongated semicylindrical exposed portion thereof extending into said trunnion bore, stop surface means engaging the exposed portion of said stop pin and compressing said stop pin against the valve body wall defining said stop recess.

4. A rotatable plug valve as set forth in claim 1, said valve body having at least one trunnion bore, said trunnion member being rotatably received within said trunnion bore, an elongated partially cylindrical stop recess formed in said valve body along an axis substantially parallel with the axis of said trunnion bore, a generally cylindrical stop pin being disposed within said stop recess and having a partially cylindrical exposed portion thereof extending into said trunnion bore, said substantially planar stop surface engaging said exposed portion of said stop pin along the length thereof and compressing said stop pin against the valve body wall defining said surface, whereby forces exerted through said stop surface will be evenly distributed along the exposed length of said stop pin.

5. A valve having a valve body defining a valve chamber and having inlet and outlet passages in communication with the valve chamber, a valve element disposed within said valve chamber and being movable between open and closed positions to control the flow of fluid through the valve, a substantially planar stop surface means provided by said valve, an elongated stop member supported within the valve and being engageable by said stop surface means to limit movement of said valve element in either direction thereof, said stop member being subjected only to compressive forces applied in evenly distributed manner along the length thereof through said stop surface means whereby shearing of said stop member and excessive Brinelling will not occur upon the application of severe forces thereto.

6. A valve as set forth in claim 5, said valve body defining an elongated stop retainer recess, said stop member being disposed within said recess and having a portion thereof extending into the path of said stop surface means, said stop surface means engaging said stop member in line contact at each extremity of travel of said valve element and applying force to said stop member in a direction toward said recess, whereby said stop member is supported by the wall defining said recess and is prevented from subjection to shear forces.

7. A valve as set forth in claim 5, said recess being partially cylindrical, said stop member being a cylindrical pin disposed within said recess, said stop surface means engaging said cylindrical pin along the length thereof and forcing said pin in a direction toward said recess.

8. A rotatable plug valve having a valve body defining a valve chamber and having inlet and outlet flow passages in fluid communication with said valve chamber, at least one trunnion member rotatably carried by said valve body, a plug member being disposed in nonrotatable relation with said trunnion member and being rotatable within said valve chamber between open and closed positions thereof to control the flow of fluid through said flow passages, a thrust support plate being fixed to said valve body and having a stop recess formed therein, elongated stop means disposed within said stop recess, substantially planar stop surface means formed on said trunnion and being engageable in line contact with said stop means to limit rotation of said trunnion and said plug member in either rotative direction thereof, said thrust support plate being adjustable to move said stop means into precise engagement with said stop surface means upon assembly of said valve, thereby compensating for any accumulation of manufacturing tolerances.

9. A rotatable plug valve as set forth in claim 8, said thrust support plate having drill guide bore means, alignment apertures formed in said valve body in precise alignment with said stop surface means, guide pin means being received in said drill guide bore means and said alignment aperture means and locking said thrust support plate and said valve body in nonrotative relation.

10. A rotatable plug valve as set forth in claim 9, said thrust support plate having a plurality of bolt openings therein, a plurality of bolts extending through said bolt openings and securing said thrust support plate to said valve body, said bolt openings being substantially larger than the diameters of said bolts whereby said thrust support plate may be rotated a slight amount relative to said bolts during assembly to compensate for said accumulation of tolerances.